Nov. 29, 1955  H. C. PETRIE  2,725,036
MEANS FOR POLYGAMOUS BREEDING OF ANIMALS
Filed April 3, 1953  3 Sheets-Sheet 1

HARRY C. PETRIE
*INVENTOR.*

BY *Smith & Tuck*

Nov. 29, 1955    H. C. PETRIE    2,725,036
MEANS FOR POLYGAMOUS BREEDING OF ANIMALS
Filed April 3, 1953    3 Sheets-Sheet 2
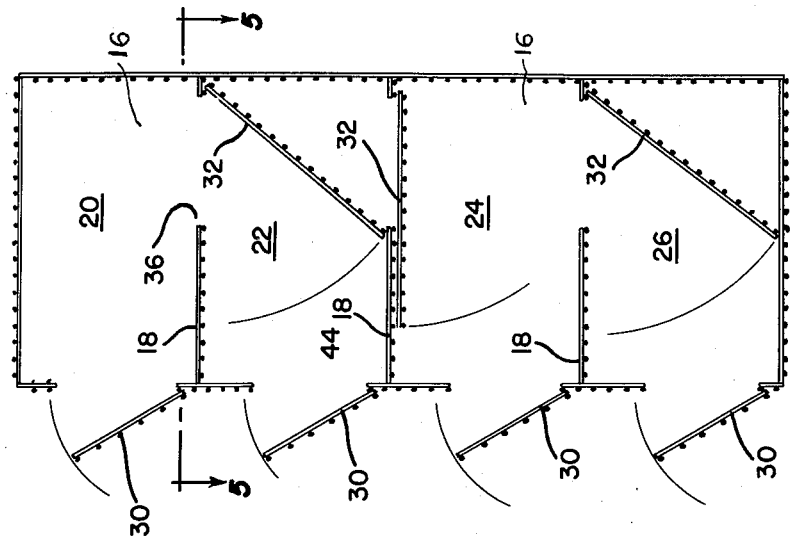
FIG—4
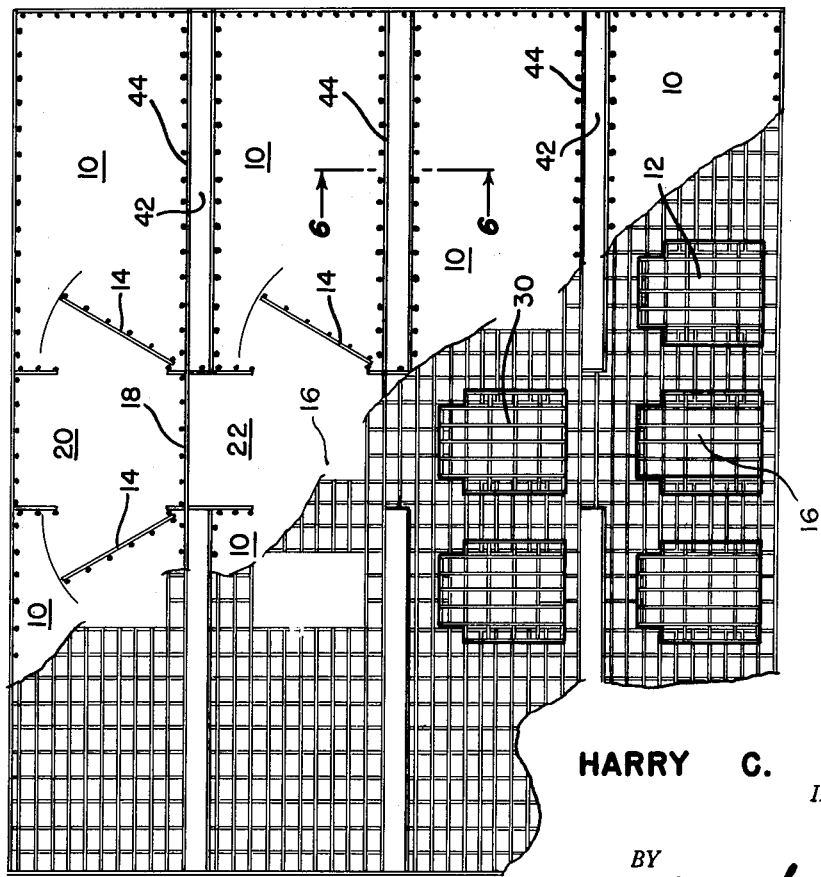
FIG—3
HARRY C. PETRIE
*INVENTOR.*
BY
*Smith & Truck*

Nov. 29, 1955 H. C. PETRIE 2,725,036
MEANS FOR POLYGAMOUS BREEDING OF ANIMALS
Filed April 3, 1953 3 Sheets-Sheet 3
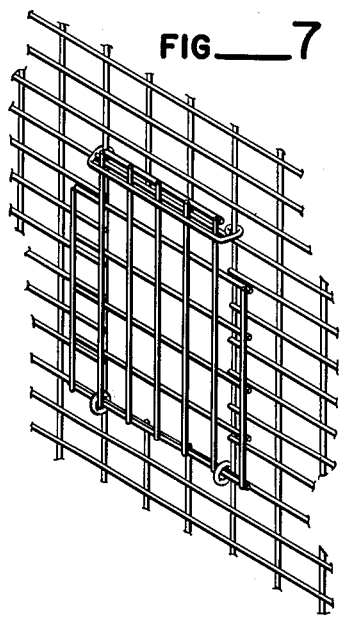
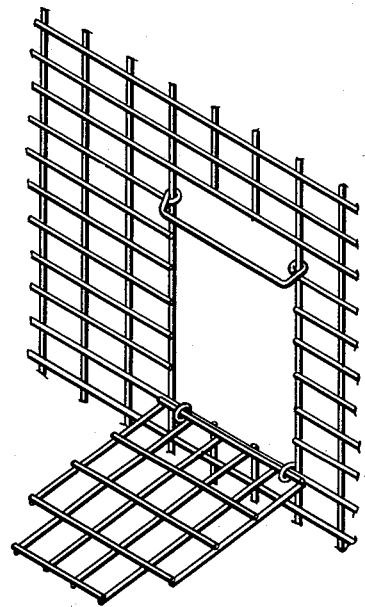
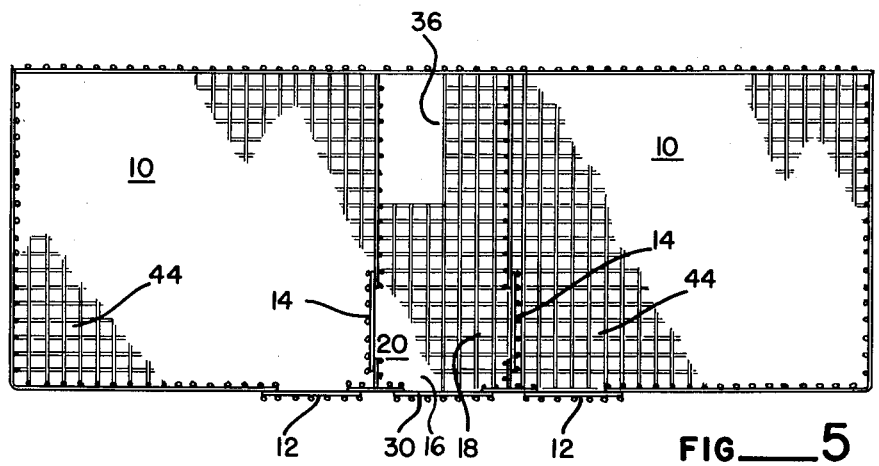
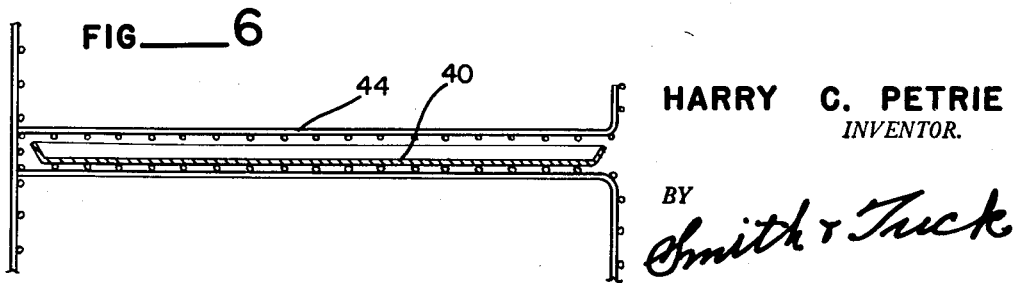
HARRY C. PETRIE
*INVENTOR.*
BY United States Patent Office 2,725,036
Patented Nov. 29, 1955

2,725,036

MEANS FOR POLYGAMOUS BREEDING OF ANIMALS

Harry C. Petrie, Seattle, Wash.

Application April 3, 1953, Serial No. 346,646

5 Claims. (Cl. 119—17)

This present invention relates to a method of polygamous breeding of animals and the general art of animal cages of the type made of open bar or screen stock wherein the animals are easily observed, and can observe, and to a degree other animals can associate with them, even though they are in separate portions of the cage. More particularly this invention relates to a method of breeding animals using a special form of cage intended to house normally a plurality of female animals, one in each separate section, and then to have a multi-storied central section, which is in effect a separate animal cage, wherein a single male of the species may come in close contact with a plurality of females. Such an arrangement as this has been found particularly adaptable to the polygamous breeding of chinchillas, for instance, in which the male becomes acquainted with a plurality of females through daily close association with them to the end that breeding at the proper time can be most readily effected.

In the past it has been common to separately house the male and female of a species of animal and to then place them together during the proper mating season. With certain animals this may be reasonably satisfactory. However, with chinchillas, for example, it has never proved satisfactory in the past and as a result chinchillas have quite generally been raised in pairs. There are several objections to this. In the first place the female is the stronger of the two animals and in many instances actually kills the male. There is another good reason why this is not desirable and that is that because of the high value placed upon these tiny animals it is never desirable to pelt the females. This means that pelts, except in the older animals, normally would be obtained largely from the males together with possibly a few sterile females. It therefore follows that polygamous breeding is very desirable in the industry entirely apart from the physiological fact that some males are more productive of better animals than others. In this present invention it is believed a very satisfactory solution has been found so that polygamous breeding can be carried on in a safe, effective manner.

The principal object of this present invention therefore is to provide animal cages wherein a runway is provided for a male so that he will have access to the outside of the cages of a plurality of the female animals.

A further object of this invention is to provide in a single unit for the housing of a plurality of female animals a plurality of female cages, preferably in a multi-storied arrangement, the arrangement having in these cages, in addition to the normal entrance openings, openings from each of the female cages into the male's runway.

A further object of this invention is to provide in a polygamous breeding cage a rather extensive runway for the male so that he will have a rather long circuitous runway which will provide him means for escape from any female attacking him.

A further object of this invention is to provide in a compact economically constructed arrangement suitable pens for a plurality of animals each with its own sanitary feeding, watering, and waste collecting means.

Further objects, advantages and capabilities will be apparent from the description and disclosure in the drawings, or may be comprehended or are inherent in the device.

In the drawings:

Figure 3 is a front elevation of my animal cage with certain parts broken away to assist in understanding the illustration;

Figure 4 is a typical, vertical cross-sectional view through the male runway portion of my cage;

Figure 5 is a horizontal sectional view, taken along the line 5—5 of Figure 4;

Figure 6 is an enlarged vertical cross-sectional view taken along the line 6—6 of Figure 3; and Figures 7 and 8 illustrate in the closed and open positions respectively the form of gate used preferably throughout my present cage.

Figure 2:
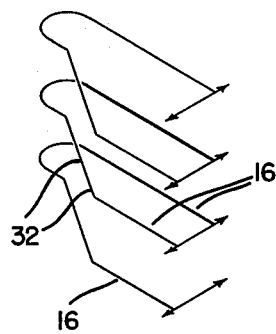
Figure 2 is a diagrammatic view illustrating the general course of the male's runway in a cage made after the showing of Figure 1.
Figure 1:
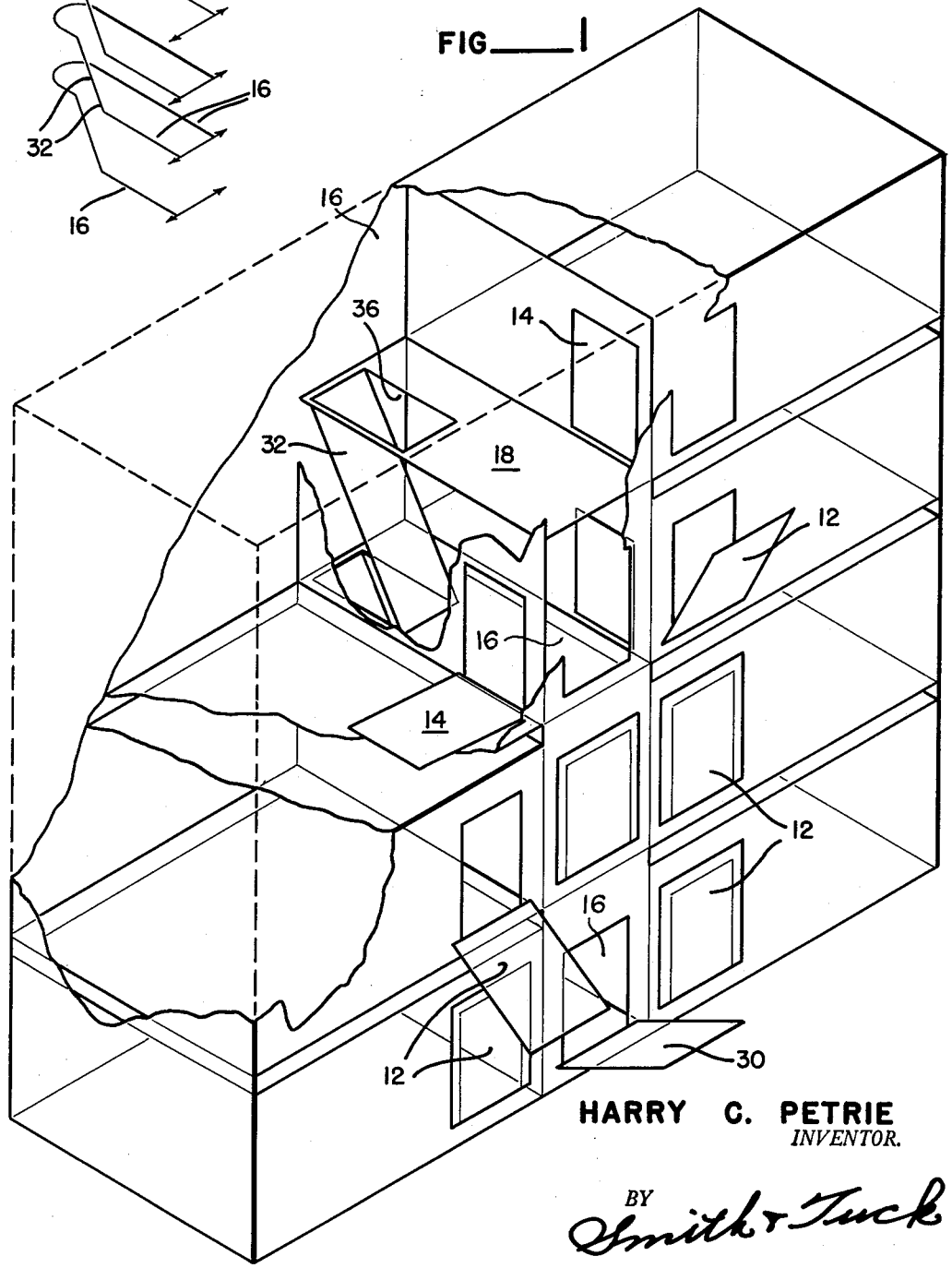
Figure 1 is a schematic perspective view, partly broken away, showing a preferred arrangement of the animal receiving compartments, for simplicity in illustration the wire normally forming the cage has not been detailed.

Referring more particularly to the disclosure in the drawings, the numeral 10 designates a typical female compartment. This is provided with the ordinary outside access gate 12 and an inside door 14 which provides access to the centrally disposed male runway 16. As the purpose of this cage is to promote polygamous breeding, it follows that a number of female compartments 10 should be used. In the accompanying illustrations eight female compartments have been illustrated which, in banks of four, face onto the male runway portion 16. The male runway portion 16 consists a plurality of compartments each having a floor or deck 18, one for each tier of female cages, as 20, 22, 24, and 26. Each of these compartments has its outside access gate 30. It also has access to the two opposite female compartments through means of doors 14. The general procedure is to allow the male free run of the four stories of his runway, after the showing of Figure 2, and to achieve this a plurality of hinged ramps 32 are provided. These ramps when in the up position as illustrated in the center of Figure 4 form a closure so that the male could be isolated in any one of the four central compartments, and this is often desirable when it is necessary to protect the male from a female. When the ramps are in the inclined position they provide adequate passage up and down from the different floors due to the fact that they are preferably made of wire mesh having wires or rods meeting at right angles so that a large number of parallel and horizontal wires assist the male in climbing or descending the ramp. In Figure 2 a diagram has been shown illustrative of the maximum run available to the male when all the ramp doors 32 are in the inclined position. It is to be noted further that a definitely circuitous route is provided and this is of real protective value to the male who quickly becomes familiar with the arrangement; and when pursued by a female who has not, by association, become familiar with the circuitous arrangement, affords the male an advantage that gives him a real measure of protection. It is to be noted that the openings 36 in each of the male compartment floors 18 occupy only one side of one end of the floor and thus the male in coming up the ramp or descending it needs to make an entire circle to either ascend to the next floor or to descend a floor.

Feeding and watering arrangements have not been illustrated as they are very common expedients. The sanitary provision however is illustrated, probably best in Figure 6, where it is to be noted that an impervious tray 40 is employed which slides into the slot 42 provided in the cage below the floor of each female's compartment. Thus droppings and wetting pass through the grating floors 44 and are caught usually in papers, or fibrous or granular materials, in pans 40 so that their disposal is achieved by merely withdrawing the pans, emptying the same and replacing them.

In making use of this special cage in polygamous breeding, it is common to have each of the females in her own individual pen with all doors closed so as to retain her in her own compartment. The male, in the case of chinchillas, is allowed free movement throughout the several stories of the central run. The animals thus all live together, but each in a separate compartment, except in the case of the male who has a range throughout his entire multi-storied arrangement. In this manner the male has a chance to visit each female repeatedly, of course with a screen wall between them. In this way the male becomes friendly with all the various females and the females, having no other male to associate with, gradually come to a friendly relationship with the male. This arrangement is a constant one in that these animals all live together as a unit and they soon lose their normal inclination to pair off.

When one of the females comes in season for breeding the male is in position to give her constant attention and will normally take up his living in that one of the number of compartments that are available to him which is on the same floor with the particular female. They are thus able to live and be very closely associated with each other except for the barrier of the screen wall. At the proper time the attendant may open the door 14 leading into the compartment of the particular female, thus permitting the male to have access to the female's compartment, and at the same time the female has access to the male's runway. In breeding, the female being the stronger of the animals, she may at times become mean in her relationship with the male and it may be necessary for the male to run away from her. It is under such conditions that the circuitous central runway of the male becomes of prime necessity as it gives him an opportunity to escape, and if the female is too persistent in her attack on him, then the attendant has ample time in which to close off the various compartments by means of ramps 32, usually so that the two animals can be separated for a period. It therefore becomes desirable that a number of such gates or ramps be provided so that separation can be more easily affected no matter in which portion of the runway the animals may have taken refuge. It therefore should be clear that it is desirable to have a plurality of doors 30 so that the attendant may reach in to separate the animals wherever they may locate themselves.

It is believed that it will be clearly apparent from the above description and the disclosure in the drawings that the invention comprehends a new method and means for polygamous breeding of animals.

Having thus disclosed the invention, I claim:

1. An animal enclosure for polygamous breeding, comprising: a series of cages for females including at least two stacks each containing a series of cages one on top of another; a runway cage for a male positioned between said two stacks and having a series of levels one for each level of female cages, said runway abutting each female cage and separated therefrom by open-work barriers, said levels of said runway cage being interconnected by a series of superimposed ramps in one corner of the runway thereby forming a labyrinth passageway from top to bottom of the runway, said ramps each being movable to a horizontal position blocking passage from one level to another of the runway, a normally closed door communicating between said runway and each female cage and a normally closed door communicating between the outside of said enclosure and each female cage and each level of said runway.

2. An animal enclosure for polygamous breeding, comprising: a series of cages for females including at least two stacks each containing a series of cages one on top of another; a labyrinth runway cage for a male positioned between said two stacks and having a series of levels one for each level of females cages, said runway abutting each female cage and separated therefrom by open-work barriers, said levels of said runway cage being interconnected by ramps; and a normally closed door communicating between said runway and each female cage.

3. An animal enclosure for polygamous breeding, comprising: a series of cages for females including at least two stacks each containing a plurality of cages one on top of another; a labyrinth runway cage for a male positioned between said two stacks and having a plurality of levels one for each level of female cages, said runway abutting each female cage and separated therefrom by open-work barriers; access means between the levels of said runway normally open to permit the male to move freely from one level to another and said access means being closeable to bar passage; and a normally closed door communicating between said runway and each female cage.

4. An animal enclosure for polygamous breeding, comprising: a series of cages for females including at least two stacks each containing a plurality of cages one on top of another; a labyrinth runway cage for a male positioned between said two stacks and having a plurality of levels one for each level of female cages, said runway abutting each female cage and separated therefrom by open-work barriers; access means between the levels of said runway permitting the male to move freely from one level to another; and a normally closd door communicating between said runway and each female cage.

5. An animal enclosure for polygamous breeding of chinchillas, comprising: a series of cages for females and a runway cage for a male having a common wall with each of said female cages, the common wall having a substantial portion of open-work in the area of each female cage, said runway cage being formed as a labyrinth normally open throughout to the male and having manually operable door means to separate the runway cage into parts, and a normally closed door communicating between said runway and each female cage.

References Cited in the file of this patent

UNITED STATES PATENTS

| 177,715 | Heins | May 23, 1876 |
| 1,050,682 | Ott | Jan. 14, 1913 |
| 1,127,712 | Wrenn | Feb. 9, 1915 |
| 1,301,660 | De Corte | Apr. 22, 1919 |
| 1,462,107 | Holman | July 17, 1923 |
| 1,703,625 | Jackson | Feb. 26, 1929 |
| 2,346,001 | Bate | Apr. 4, 1944 |

FOREIGN PATENTS

| 387,423 | Great Britain | Feb. 9, 1933 |
| 631,222 | Great Britain | Oct. 28, 1949 |